Jan. 15, 1935.　　　　P. BOGOUTSKY　　　　1,988,414
BORING APPARATUS ADAPTED FOR THE REMOVAL OF THE
MATERIAL BY AUTOMATIC DREDGING DEVICES
Filed May 4, 1932　　　4 Sheets-Sheet 1
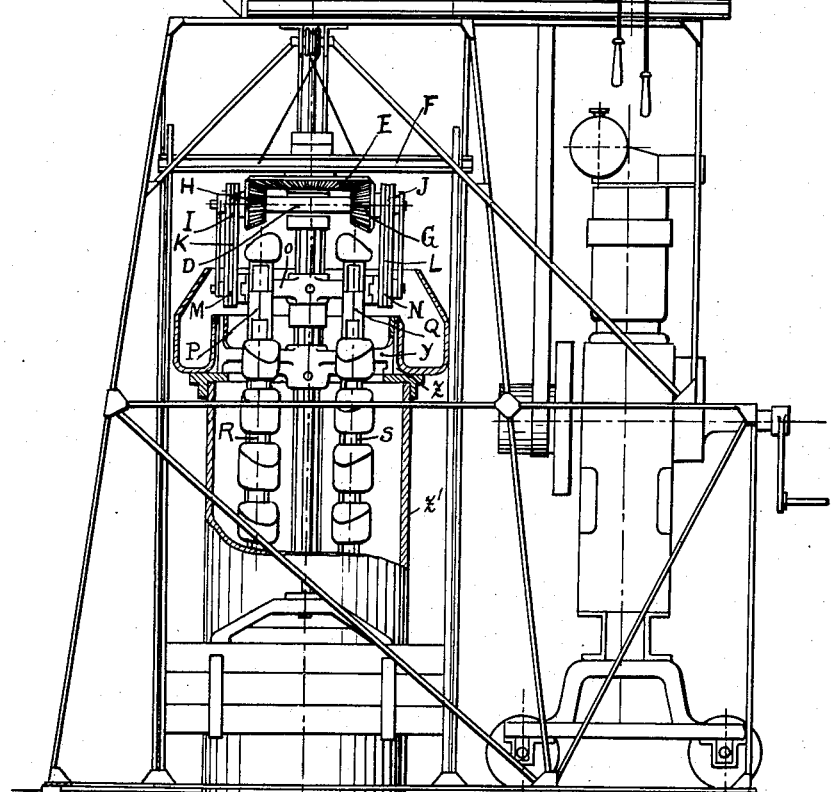
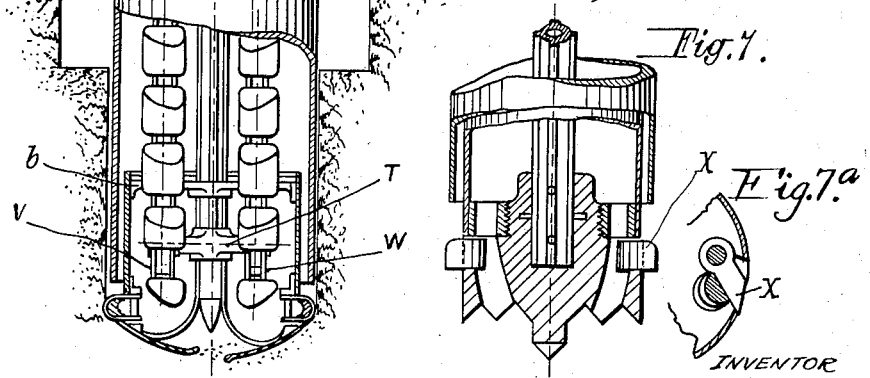

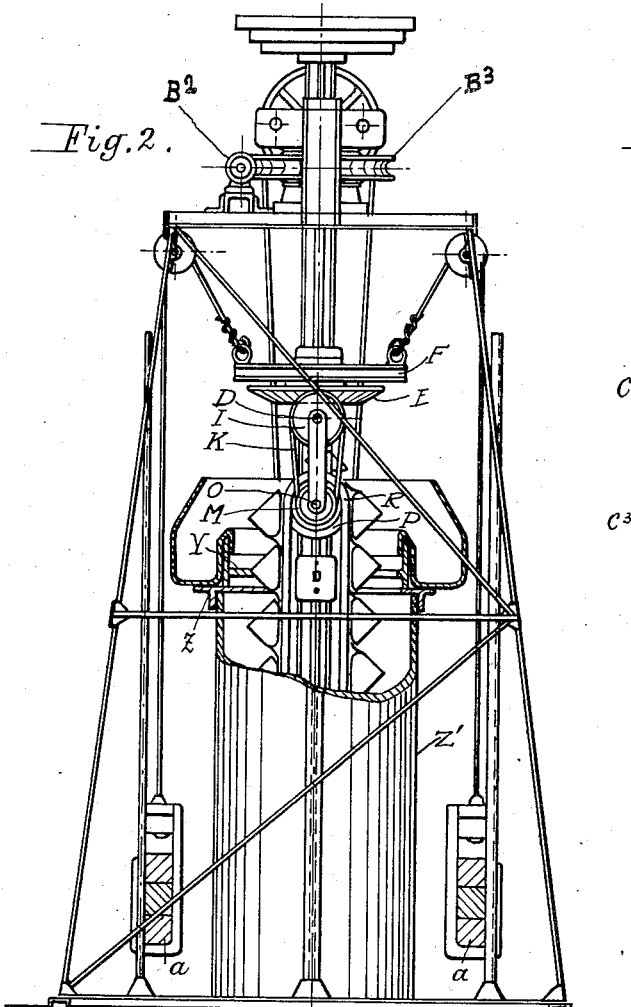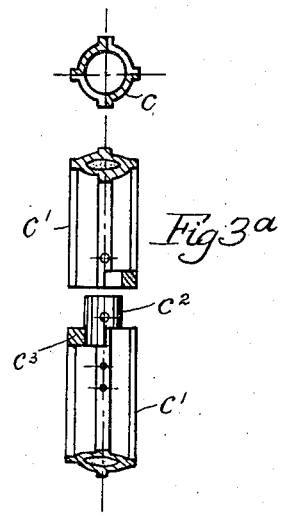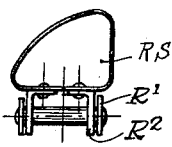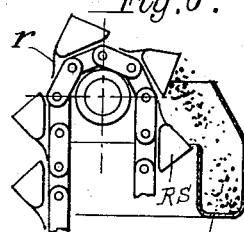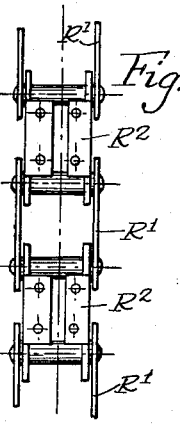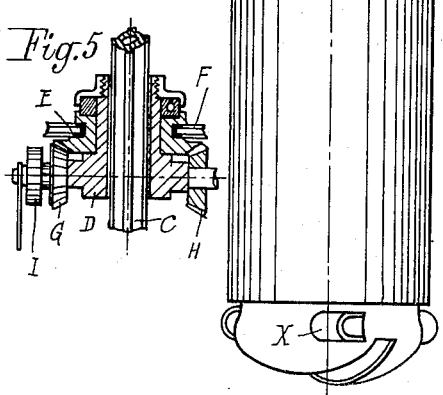

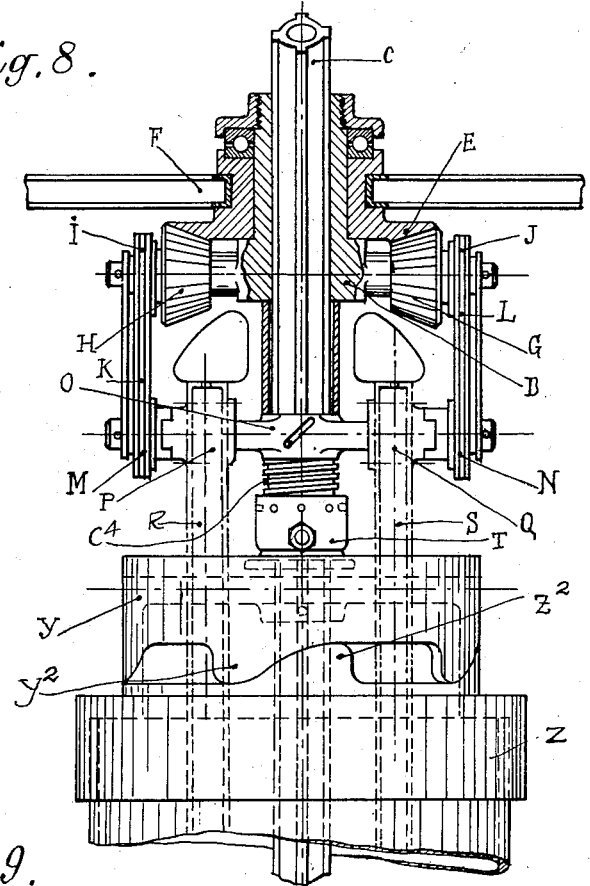
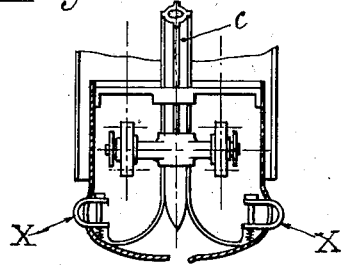
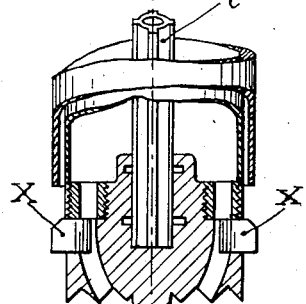
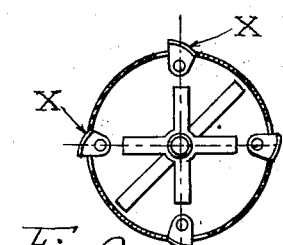

Patented Jan. 15, 1935

1,988,414

UNITED STATES PATENT OFFICE 1,988,414

BORING APPARATUS ADAPTED FOR THE REMOVAL OF THE MATERIAL BY AUTOMATIC DREDGING DEVICES

Pierre Bogoutsky, Paris, France

Application May 4, 1932, Serial No. 609,298
In France April 20, 1931

5 Claims. (Cl. 255—21)

The present invention relates to a boring apparatus adapted for the automatic and continuous removal of the material by means of dredging elevators.

In the accompanying drawings and by way of example:

Figs. 1 and 2 are respectively an elevational and a side view of a form of construction of the apparatus in conformity to the invention.

Fig. 3 shows the central shaft in transverse section.

Fig. 3a represents a fragmentary view of the central shaft in elevation.

Fig. 4 is a plan view of a part of a bucket elevator.

Fig. 4a represents a view in elevation of a part of the elevator chain.

Fig. 5 shows vertical section of the driving mechanism of the elevators.

Fig. 6 represents the discharging mouth of the buckets.

Fig. 7 is a vertical section of a modified construction of a boring tool.

Fig. 7a is a partial horizontal section of the tool on the line 7—7 of Figure 7.

Fig. 8 shows the arrangement for stretching the bucket chains and tool mechanism.

Fig. 9 is a vertical sectional view of another form of the boring tool.

Fig. 9a is a horizontal sectional view taken on the line 9—9 of Figure 9.

Fig. 10 is a vertical sectional view of another variation of the boring tool.

Fig. 10a is a horizontal sectional view taken on the line 10—10 of Figure 10.

The movement produced by hand crank or by motor is imparted to pulleys A which drive sprocket wheels B—B$^1$ connected together by chain, a worm B$^2$ and a worm-wheel B$^3$, and this arrangement constitutes the speed-reducing device.

The wheel B$^3$ rotates the central shaft C which carries the boring tool at its end. This shaft is hollow, and is provided with longitudinal tongues C$^1$, said shaft being adapted to rotate the dredging devices by special means.

A transverse axle D is secured to the shaft C and is given a movement of horizontal rotation, but it cannot rotate upon its own axis. In line with the hub of the axle, and along the central shaft C, is mounted a bevel gear wheel E, which is maintained by a support F by which it is held against rotation. The bevel pinions G—H are rotatable on the respective ends of the axle D, and when the said axle turns in the horizontal plane, it causes the two pinions to move about the said bevel wheel E, and the pinions are thus rotated.

Two sprocket-wheels I—J are secured to the respective pinions G—H, and by means of chains K—L they drive the respective sprocket-wheels M—N which are mounted on a transverse axle O and serve to actuate the respective chain-wheels P—Q by means of coupling teeth. The wheels P—Q carry special chains on which are mounted the buckets R—S, and in this manner the buckets are enabled to travel between the axle D and the axle O.

In the interior of the boring tool, and on the central shaft C, is mounted a lower shaft T which maintains the bucket chains R—S by means of chain-wheels V—W. Said chain consists of links which are alternately straight and bent at right-angles, and upon the right-angled parts are directly mounted the buckets R—S.

The earth or rock which is removed by the boring tool and the lateral cutting bars X which serve to enlarge the excavation, is brought up by the buckets R—S and is discharged into recipients X$^1$ consisting of two semi-cylindrical members, said recipients being suspended from a support Y which is secured to the central shaft C; said support, as it continues to descend into the ground, bears upon the bottom Z, whereby the sinking tubes Z$^1$ will be drawn forward. The buckets are provided at their bottoms with metal sheets which guide the materials discharged from the preceding bucket, Figure 6.

Figure 11:
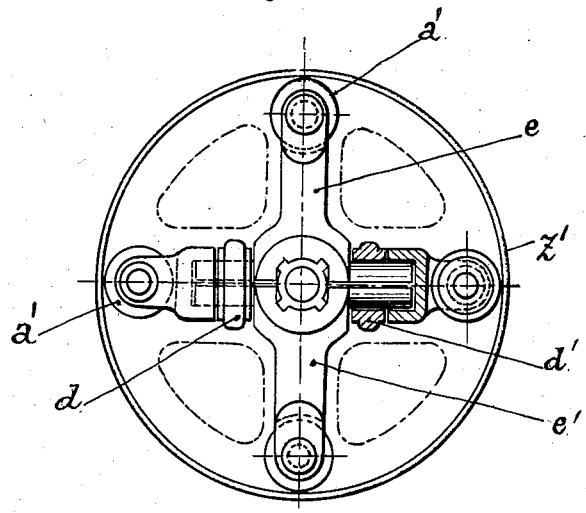
Fig. 11 is a plan view with partial transverse sections of the device for centering and guiding the driving shaft of the boring tool.
Figure 11A:
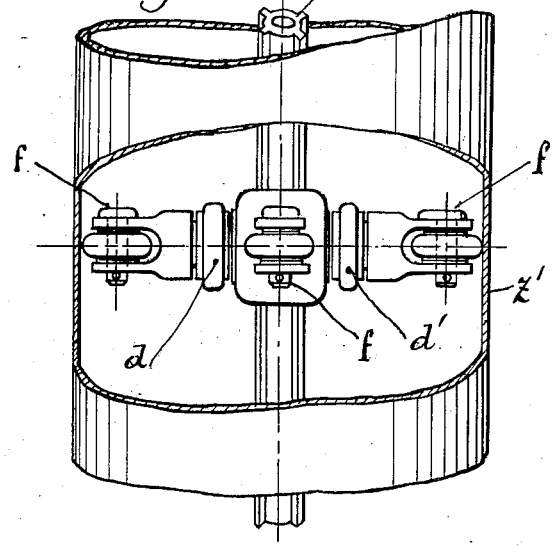
Fig. 11a is a view in elevation of Figure 11 and showing the exterior tube as being partially broken away.

For the centering of the shaft C of the boring tool, and in order to avoid all bending or buckling, the device shown in Fig. 11 is employed. This device consists of a cross-shaped member e—e' which is mounted on the shaft C and bears upon the internal wall of the protecting tube Z$^1$ by means of rollers a$^1$. For the assembling of the apparatus, the cross-shaped member consists of two symmetrical pieces which are mounted on either side of the shaft C and are secured to its longitudinal grooved parts. These pieces are assembled by sliding, upon the two halves of the said cross-shaped member when put together, a guiding roller d d' used for the bucket chains of the elevator.

The operation is as follows. To commence the boring, a small pit or hole is dug out, in which the apparatus is placed exactly in the vertical position, it being driven by means of a clutch coupling or by other suitable driving gear.

At the commencement of the boring, it is preferable to load the shaft C at the top, but during the work, this load is not required, as it is amply compensated by the weight of the mechanism which is acting on the shaft C. When necessary, said weight may even be compensated in part by means of springs or counterweights $a$ suspended from the retaining support F.

The said apparatus is provided with a boring tool consisting of a tube $b$ whose end, having the form of a large cap, is split into two parts. Through the opening thus formed, the earth or rock material enters the interior of the boring tool. The tool must have a free movement in the protecting tube $Z^1$, while at the same time it bores out a hole whose diameter is larger than the outer diameter of the said tube. For this purpose, the boring tool is provided with lateral scrapers X of special shape and of U section, which are rotatable in an eccentric manner about their pivot axles which are mounted in the interior of the boring tool $b$, their movements being limited by apertures in the said tool. The said scrapers are opened out by the action of the earth itself, and the material obtained by the hole first made by the boring tool will also enter this latter, after which the whole is raised by means of the buckets R—S.

Due to the present construction, the bucket chains move at a greater speed than the boring tool, and the buckets B scrape up the contents (earth, water) and elevate the same for discharge into suitable recipients.

As the boring tool descends, the central shaft C is lengthened by means of tubes having the same section.

The connection is assured by a solid shaft $C^2$ which is fitted into the tube and is riveted in place (Fig. 3). The other end is tightly screwed, and the torsion and continuity of the longitudinal tongues are provided for by teeth $C^3$, the device being so arranged that the ends of the tubes will fit into one another. The bucket chains are lengthened, the protecting tube $Z^1$ is sunk in the ground, and the boring is continued.

The apparatus may operate in connection with a large recipient, of cylindrical form, with hinged bottom opening towards the interior. The earth or rock enter through this opening, and the bottom then closes by the weight of the contents.

To automatically provide for a constant tension of the bucket chain, a tensioning device $C^4$ may be placed around the shaft C, which device bears upon the support Y and upon the axle O carrying the pinions M—N (Fig. 8.)

For boring in usual ground, such as vegetable earth, mud, sand, clay, slightly agglomerated sand, gravel, pebbles etc. . . . a boring tool of modified form is employed. The cutting capacity of the tool will be somewhat less for rocky ground, such as rock in decomposition or sedimentary rock.

The said boring tool is provided with cutters X which are pivoted on their axles in an eccentric manner and are adapted to open by friction. To insert them into the tube $Z^1$, the boring tool is rotated in the reverse direction, withdrawing the tool while raising the central shaft C, the upper parts of these cutters X being rounded. By a simple friction against the end of the tube $Z^1$, the cutters will thus enter the orifices which afford them passage.

The bottom part of the boring tool may be flat, or it may have the form of teeth of different sizes, or of tapered teeth (Fig. 7). The lower part of the teeth is grooved in both directions, so that they will have the form of wide pyramids with inverted tops. The corners of the boring tool extend somewhat to the outside, in order to protect the sides of the excavation against all prejudicial friction by the boring tool. This latter is of hard steel, slightly tempered, or of cast iron, with a steel shaft fitted into the tool. The boring tool is cooled immediately after the casting operation, in order to form a very hard surface layer. When the tool rotates, as its end is provided with cutting projections, this will cause vibrations. Due to the weight of the mechanism acting upon the shaft C, this latter will produce short and repeated shocks, and this effect can be increased if necessary by the use of fixed ramps $Z^2$ mounted on the cap Z of the protecting tube $Z^1$ and of corresponding ramps $Y^2$ pertaining to the rotating part, and thus the boring tool is slowly raised by said ramps, by which the tool is given periodic displacements while the boring is pursued in a continuous manner (Fig. 8.)

The boring tool grinds up all the material with which it makes contact, and the parts thus disaggregated are raised (through the free space of the boring tool as well as through the apertures around the shaft C) and the material is then elevated to the top by means of the buckets.

This apparatus is particularly adapted for use in connection with piles, but its application covers a very extensive field, for instance for work such as foundations for all building construction, as well as for constructions of ports, jetties, docks, boat landings, wharves, or as a foundation for the abutments of bridges, and in general for the foundations of all work adapted for shipment or traffic, in which strong foundations or supports are required.

It may be employed to great advantage in the preparation of holes for poles and supports, for instance for electric power or telephone lines, and the like.

The advantages of this arrangement are as follows:

1. As it is very compact, it will execute all work, and even under a building already erected.
2. It is readily handled, as it consists of four distinct parts:
   (a) a support
   (b) a carriage with speed-reduction and driving gear;
   (c) boring tools, with the arrangement of bucket chains;
   (d) motor.
3. The apparatus, due to its high speed, to its continuous operation, and to the simple construction of its mechanism, requires a greatly reduced labor force.
4. It is economical, owing to its easy handling, as the apparatus has a total weight of only about 1.000 kgs., it being divided into four parts. It is more than 30 times lighter than an ordinary pile driver.
5. Its boring capacity is three times that of the usual apparatus.
6. It provides for the boring of holes which are closely spaced, and affords a strength per square meter, which is about 6 times what is usually obtained.
7. It eliminates all work requiring the use of compressed air caissons, which is expensive and difficult.

8. It can operate in water or mud, and by its use the piles, even in water, can be given the desired height.

9. No molds or forms are required for the piles.

10. The resulting piles are free from all cracks, and thus have a greater strength against side thrusts.

11. In regions of permeable earth, it is preferable to use concrete protecting tubes and to form the piles directly in these tubes without removing the latter, so that the piles will not be in contact with water before the setting takes place.

12. Borings executed with this apparatus afford greater safety in the way of avoiding vertical settling or sinking, due to an exact knowledge of the ground and to a proper choice of the stopping point of the base, and also to the increased bearing surface as compared with the pointed ends of the usual driven piles.

I claim:

1. In a rotating boring apparatus having a rotating vertical shaft, a digging auger carried at the lower extremity of said shaft, said auger comprising a cup-shaped body having its bottom formed with a transversely extending slot constituting an entrance and the bottom being sharpened along a side of the slot to form a cutting edge, side walls of said body being formed with openings adjacent the bottom, means for connecting said body with the shaft to turn therewith, and scrapers pivoted within said body and eccentrically movable through the openings in the walls of the auger body, said scrapers being moved eccentrically by rotation of the shaft and auger and projecting through the slots in the wall of the auger and adapted to be swung outwardly through the slots by rotation of the auger in one direction whereby a trough of greater diameter than the auger will be bored, said scrapers being adapted to swing interiorly of the auger body when the auger is rotated in an opposite direction.

2. In a rotary boring device having a rotating vertical shaft provided with a digging auger fixed to its lower extremity and elevator buckets rotating with said shaft, a non-rotatable protector tube adapted to be driven downwardly in a bored trough, ramps carried at the upper end of said tube, and a support carried on the vertical shaft and carrying cogs, said cogs cooperating with said ramps for transmitting vertical movements to the shaft during rotation thereof and to transmit shocks caused by these movements directly to said tube and thrusting it downwardly in a hole being dug.

3. In a rotary boring device having a rotatable vertical shaft provided with an auger at its lower extremity and elevator buckets adapted to rotate with said shaft, a non-rotatable protector tube adapted to be driven within a bored trough, a support carried on the vertical shaft and resting upon the upper end of the protector tube, a transverse axle mounted above the support for permitting vertical sliding movement of the central shaft rotating with said axle, chained wheels mounted on the transverse axle and supporting the upper end portions of the elevators, and means disposed between the axle and said support for regulating tension against said axle.

4. In a boring device having a rotary shaft, an auger comprising a cup-shaped body, means for connecting said body with said shaft to turn with the shaft, a transverse slit being formed in the bottom of said body and lateral openings being formed in side walls of the body, vertical axes fixed to the interior of the body near the said openings, scrapers pivoted on said axes and extending obliquely across the said openings and outwardly through the same whereby the scrapers will be moved to extended and retracted positions by engagement of their outer ends with material to be removed according to the direction in which the auger is turned.

5. In a rotating boring device bearing a vertical rotating shaft provided with an auger fixed to its lower extremity and elevator buckets turning with the said shaft, a protector tube thrust into the bored hole and held against turning, ramps disposed at the upper end of the said tube, and a cog support disposed on the said vertical shaft, the said cogs cooperating with the said ramps in a manner to give vertical movement to the said shaft during its rotation and to transmit the shocks caused by these vertical movements directly to said tube in thrusting it.

PIERRE BOGOUTSKY.